United States Patent [19]

Edwards

[11] 4,030,204

[45] June 21, 1977

[54] REMOTE INDICATING SOLID STATE MAGNETIC SENSOR

[76] Inventor: Robert A. Edwards, 12 Notch Park Road, Little Falls, N.J. 07424

[22] Filed: Mar. 18, 1974

[21] Appl. No.: 452,430

[52] U.S. Cl. .................................. 33/361; 324/45
[51] Int. Cl.² ...................................... G01C 17/30
[58] Field of Search ............ 33/355, 357, 558, 361, 33/363; 324/45, 44

[56] References Cited

UNITED STATES PATENTS

| | | | |
|---|---|---|---|
| 2,389,146 | 11/1945 | Fragola et al. | 324/43 R X |
| 2,909,846 | 10/1959 | Bellon | 33/357 |
| 3,661,089 | 5/1972 | Soltz | 324/45 |
| 3,683,668 | 8/1972 | Baker et al. | 33/361 |

FOREIGN PATENTS OR APPLICATIONS

2,040,552   3/1971   Germany ............................ 33/361

Primary Examiner—William D. Martin, Jr.

[57] ABSTRACT

A solid state magnetic sensor system for indicating the direction of an applied magnetic field and more specifically as a compass system for use with automobiles or the like. The system consists of a dashboard mounted readout unit which receives signals provided thereto from a remotely located solid state magnetic bearing sensor, the latter being responsive to the earth's magnetic field. The solid state magnetic bearing sensor described herein, includes a pair of Hall effect semiconductors and ancillary electronic circuits. Two ancillary circuit types are described. One circuit is designed to output digital codes indicative of magnetic heading; the other circuit is designed to output two currents which are indicative of sine and cosine components of magnetic heading. The circuit designed to output digital codes includes sinusoidal waveform generators, a binary counter, a differential comparator amplifier and digital latch and decoding circuits. The circuit designed to output currents indicative of sine and cosine components of magnetic heading are comprised of a pair of linear differential buffer amplifiers. The dashboard mounted readout unit designed to accept digital codes may be defined by a plurality of discrete indicators, such as light emitting diodes, or segmented alpha indicators or so forth may be employed. The dashboard mounted readout unit designed to accept two currents which are indicative of sine and cosine components of magnetic heading may be characterized as a pointer which is pivoted about an axle by the influence of the magnetic field induced by a surrounding stator whose windings receive the aforementioned two currents. The solid state sensor unit is preferably located at a point on the vehicle distant from large bodies of iron or steel and where the earth's field is strong relative to fields associated with permanently magnetized auto parts.

1 Claim, 14 Drawing Figures

REMOTE INDICATING SOLID STATE MAGNETIC SENSOR

BACKGROUND OF INVENTION

This invention relates to remote indicating magnetic compasses, and more specifically, relates to a compass system for providing bearing information at a visually accessible point on an auto dashboard. The following was pointed out in a prior patent application entitled REMOTE INDICATING MAGNETIC COMPASS Ser. No. 428,460 filed Dec. 1973:

"Up until the present time, auto compasses have largely been regarded as accessories that are purchased by motorists subsequent to, and separate from the automobile itself. These prior art accessories commonly, for example, are attached to auto windshields or dashboards by means of a suction cup, or by other means. The mounting location is selected as remote as possible from magnetic material, and compensation adjustments may be present which can be manipulated after the compass is installed. These prior installations are in point of fact, unattractive, undependable, and makeshift. They usually are not lighted since carrying wires to the unit from the dashboard requires drilling holes through the dashboard to make an electrical connection. Some units do carry batteries and ON-OFF switch for momentary night viewing, but, as is so with flashlights, the batteries are usually discharged when called upon for service. In consequence of the foregoing factors, it may be observed that present auto compasses are by and large of but limited utility, and indeed tend to be treated by the public, more as a novelty item or conversation piece rather than as a valuable aid to the motorist.

In the past, several basic forms of transmitting (remote-indicating) compasses have been developed and described. Reference may be had in this connection, for example, to the treatise MAGNETIC COMPASSES AND MAGNETOMETERS by Alfred Hine, University of Toronto Press, Toronto, Canada (1968). Among other systems described therein, are those which derive a signal from a master compass via magnetic coupling, capacitive coupling, resistance coupling, and photo-electric coupling to discs driven by the master compass. All these reported systems are designed to position a repeater compass needle to precisely correspond to the needle position of the master unit, using either open loop or closed loop servo-control techniques. These compasses are, however, high cost precision instruments, not intended or practical for use in auto installations.

In the last-mentioned connection, it is important to appreciate an understanding of the instant invention, that the function of a compass in an automobile installation is distinct from the function performed by a compass in aircraft or marine vessels. In the latter two environments, the instruments are called upon to provide precise bearings, which are absolutely essential for navigation purposes. In the case of the automobile, however, the motorist does not rely upon the encompass for precise navigation. On the contrary, the motorist is obliged to follow a road which may meander in various directions. As he proceeds his interest is not, therefore, one in knowing a precise bearing in exact degrees at all times; but rather is one of having sound information regarding his general direction of progression. This in order that he might assure himself that he is proceeding generally where he wishes to go, and also so that he may appropriately alter his course upon unmarked roads or so forth, and yet be assured of his general direction of advance."

In accordance with the foregoing, it may be regarded as an object of the present invention, to provide a magnetic compass system for use in automobiles, which is accurate and dependable, and which is adapted for direct installation on dashboard or the like, whereby such instrument may be readily provided as a factory option at time of automobile assembly.

It is a further object of the present invention, to provide a magnetic compass system, adapted for installation on dashboards of automobiles or the like, which is so constructed as to enable minimization of the magnetic effects induced on the compass by masses of ferromagnetic material in the automobile.

It is a still further object of the present invention, to provide a solid state magnetic compass system for use in automobiles, which includes a dashboard-mounted bearing indicator, provided with illuminated visual displays; which displays further may be either in discrete or continuous form indicative of the direction of vehicle progression.

SUMMARY OF INVENTION

Now in accordance with the present invention, the foregoing objects, and others as will become apparent in the course of the ensuing specification, are achieved in a magnetic compass system comprising two basic components: a solid state digital compass sub-assembly and a bearing indicator read-out unit. The solid state compass sub-assembly may comprise two Hall effect semiconductor slabs and associated electronic circuits mounted in a support housing. The housing may also contain bar magnets positioned by adjustable screw which cancel out spurious magnetic fields caused by the permanent magnetization of the vehicle on which the instrument is installed.

The bearing indicator readout unit receives signals from the solid state sensor unit and uses them to produce a visual display of magnetic heading. Performance of the bearing indicator is unaffected by the presence of magnetic fields or materials; hence it can be placed next to or integrated with other dashboard instruments.

BRIEF DESCRIPTION OF DRAWINGS

The invention and its principle of operation are diagrammatically illustrated by way of example, in the drawings appended hereto, in which.

DESCRIPTION OF PREFERRED EMBODIMENTS

The Hall effect has been described in several texts relating to semiconductor technology including the one written by Sylvester P. Gentile entitled "Basic Theory and Application of Tunnel Diodes" copyright 1962 by D. Van Nostrand Company, Inc. This text points out the Hall effect refers to the phenomenon of the occurrence across a conductor of a voltage that is at right angles to the externally applied voltage when the conductor is subjected to an external magnetic field. The Hall voltage is proportional to the magnitude of current flow through the conductor and the intensity of the externally applied field as indicated by Equation 1.

$$V_H = KHI \qquad \text{(Eq. 1)}$$

$V_H$ = Hall Effect Voltage
$H$ = Magnetic Field Intensity
$K$ = Proportionality Constant.

Figure 1:
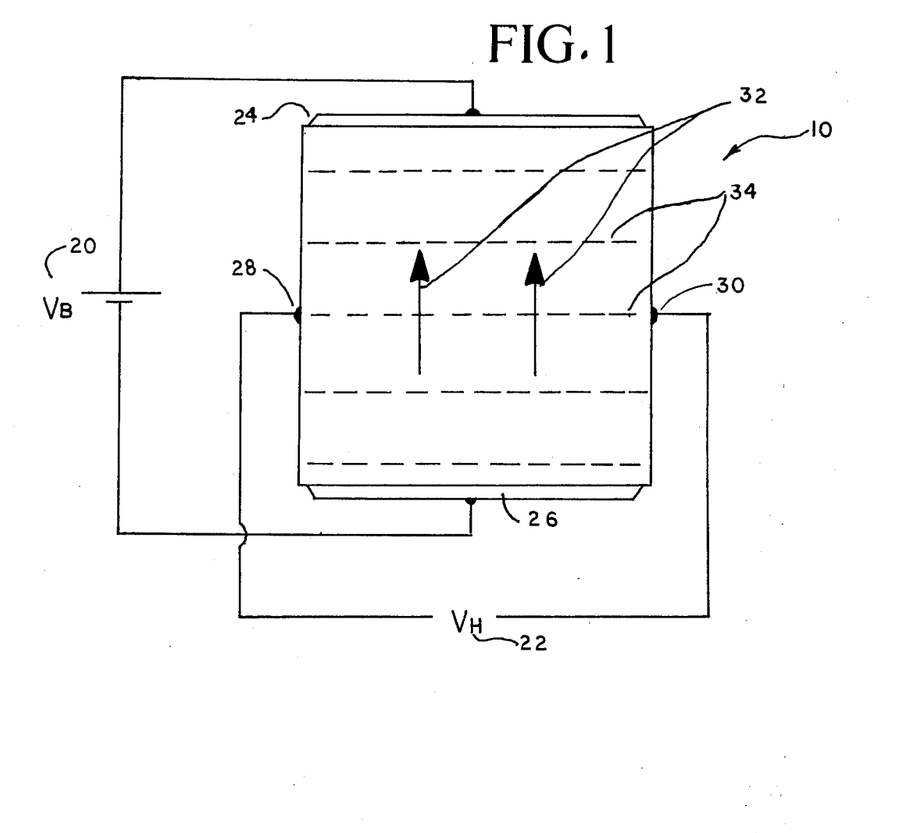
FIG. 1 is a plan view of a semiconductor slab not in a magnetic field but with an applied voltage across a pair of parallel edges. Slab equipotential surfaces are illustrated.

FIG. 1 is a plan view of semiconductor slab 10 not in a magnetic field but having an applied voltage $V_B = 20$ across a pair of edges 24 and 26. Current I, 32 flows uniformly through the slab creating equipotential surfaces 34 indicated as dashed lines. Hall Voltage $V_H$, 22 is zero across the pair of terminals 28 and 30 attached to points on the slab's other pair of edges.

Figure 2:
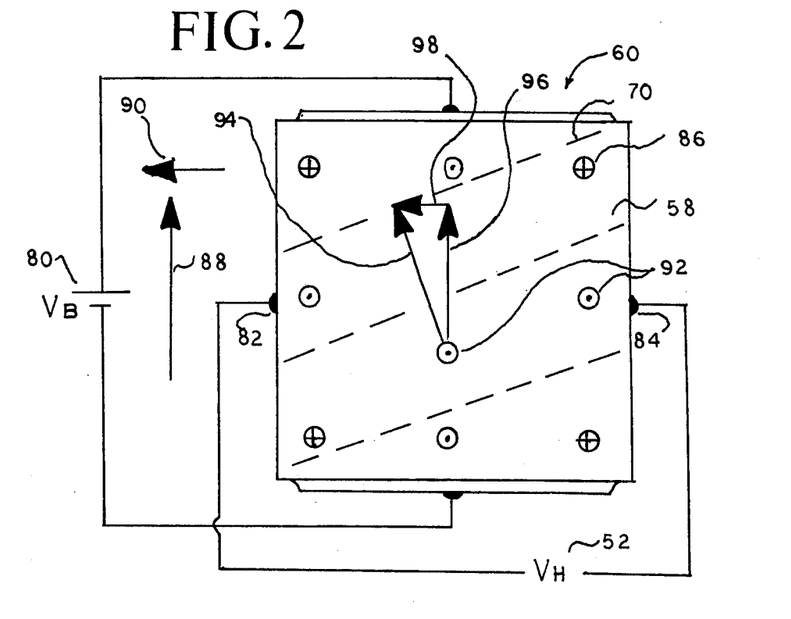
FIG. 2 is a plan view of a semiconductor slab in a magnetic field which is directed normal to the slab surface and with a voltage applied across a pair of parallel edges. Rotation of slab equipotential surfaces due to the presence of the magnetic field is illustrated.

FIG. 2 is a plan view of semiconductor slab 60 having an applied voltage $V_B$, 80 and in a magnetic field H, 86 directed at right angles to the direction of the electric field $E_B$, 88 and to the semiconductor surface 58. The magnetic field exerts a force $F_M$, 90 on electrons 92, the force direction being at right angles to the applied electric field intensity $E_B$, 88 and the magnetic field. The current I, 94 now flowing in the semiconductor has two components: $I_B$, 96 flowing in the direction of the applied electric field and a transverse component $I_H$, 98 flowing in the direction of the force $F_M$. The Hall Voltage $V_H$ represents the drop in potential across semiconductor terminals 82 and 84 caused by $I_H$, 98, and lines 70 illustrate rotation of slab equipotential surfaces.

Figure 3:
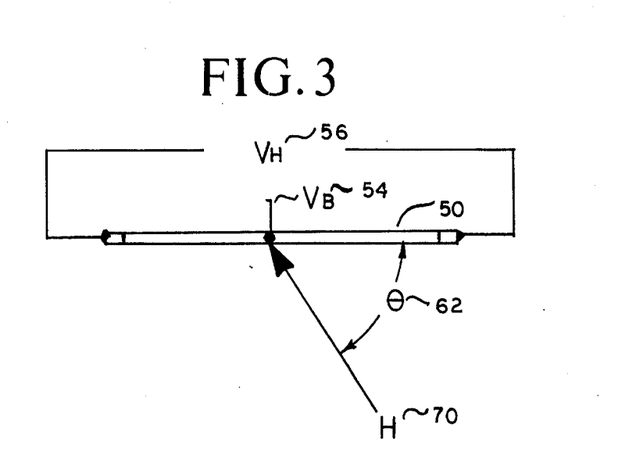
FIG. 3 is a plan view of the edge of a thin semiconductor slab in a magnetic field. A voltage is applied across a pair of the slab's parallel edges.

FIG. 3 is a plan view of a semiconductor edge 50. With reference to FIG. 3, when a semiconductor slab 50 is in a magnetic field H, 60 which is directed relative to the slab's surface by angle θ, 62 and with an applied voltage $V_B$ 54, the Hall Voltage $V_H$ 56 is expressed by Equation 2.

$$V_H = K V_B H \sin \theta \qquad \text{(Eq. 2)}$$

Figure 4:
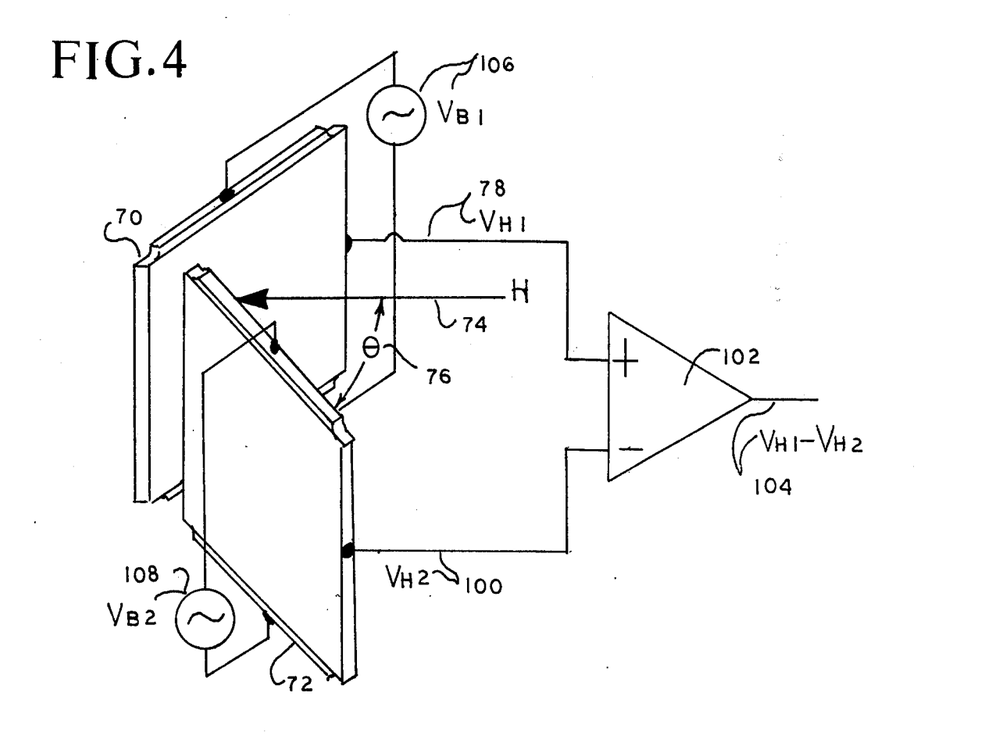
FIG. 4 is an isometric projection of a pair of semiconductor slabs mounted at right angles to one another, in a magnetic field whose direction relative to slab surfaces is defined by the angle $\theta$. Voltages are applied across pairs of parallel edges. Hall voltages developed across other edges are shown connected to the inputs of a differential comparator type amplifier.

FIG. 4 is an isometric projection of two semiconductors 70 and 72 mounted at right angles to one another, in a magnetic field H, 74 directed relative to the semiconductor slab surfaces as defined by the angle θ, 76, and with applied Voltages $V_{B1}$ 106 and $V_{B2}$, 108, Equations 3 and 4 express the relationship of developed Hall Voltages $V_{H1}$ and $V_{H2}$ to magnetic field intensity and direction, and to the voltages applied to the semiconductor.

$$V_{H1} = V_{B1} K1 H \cos \theta \qquad \text{(Eq. 3)}$$
$$V_{H2} = V_{B2} K2 H \sin \theta \qquad \text{(Eq. 4)}$$

The Hall voltages shown on lines 78 and 100 are connected to the input terminals of a differential amplifier 102 which outputs the amplified difference of the two Hall voltages $VH_1 - VH_2$ on line 104. When the two semiconductor material constants K1 and K2 are equal to K and $VB_1$ and $VB_2$ are sinusoidal time varying waveforms i.e.

$$V_{B1} = V \sin \omega t \qquad \text{(Eq. 5)}$$
$$V_{B2} = V \cos \omega t \qquad \text{(Eq. 6)}$$

then:

$$V_{H1} - V_{H2} = KVH (\cos \theta \sin \omega t - \cos \omega t) \qquad \text{(Eq. 7)}$$

Inspection of Equation 7 indicates that for any given angle of incidence θ, $VH_1 - VH_2$ is: (1) a sinusoidal time varying function, (2) is zero when ωt = θ or when ωt = θ + 180° (3) has a positive slope at zero crossover for values of ωt = θ and (4) has a negative slope at zero crossover for valves of ωt = θ + 180°. When the amplifier 102, illustrated in FIG. 4 is a high gain differential comparator type, its output 104 will either be at a logic one or a logic 0 except at the aforementioned crossovers where its output switches state. Thus ωt is equal to θ when the amplifier switches from a logic 0 to a logic 1. Binary codes representative of the value of ωt which are developed simultaneous to the generation of the synthesized voltage sin ωt, may therefore be stored as codes in digital latch type circuits at times when the amplifier switches from logic 0 to logic 1 and these codes which then represent θ or bearing may be wired to a remote readout unit.

Figure 5:
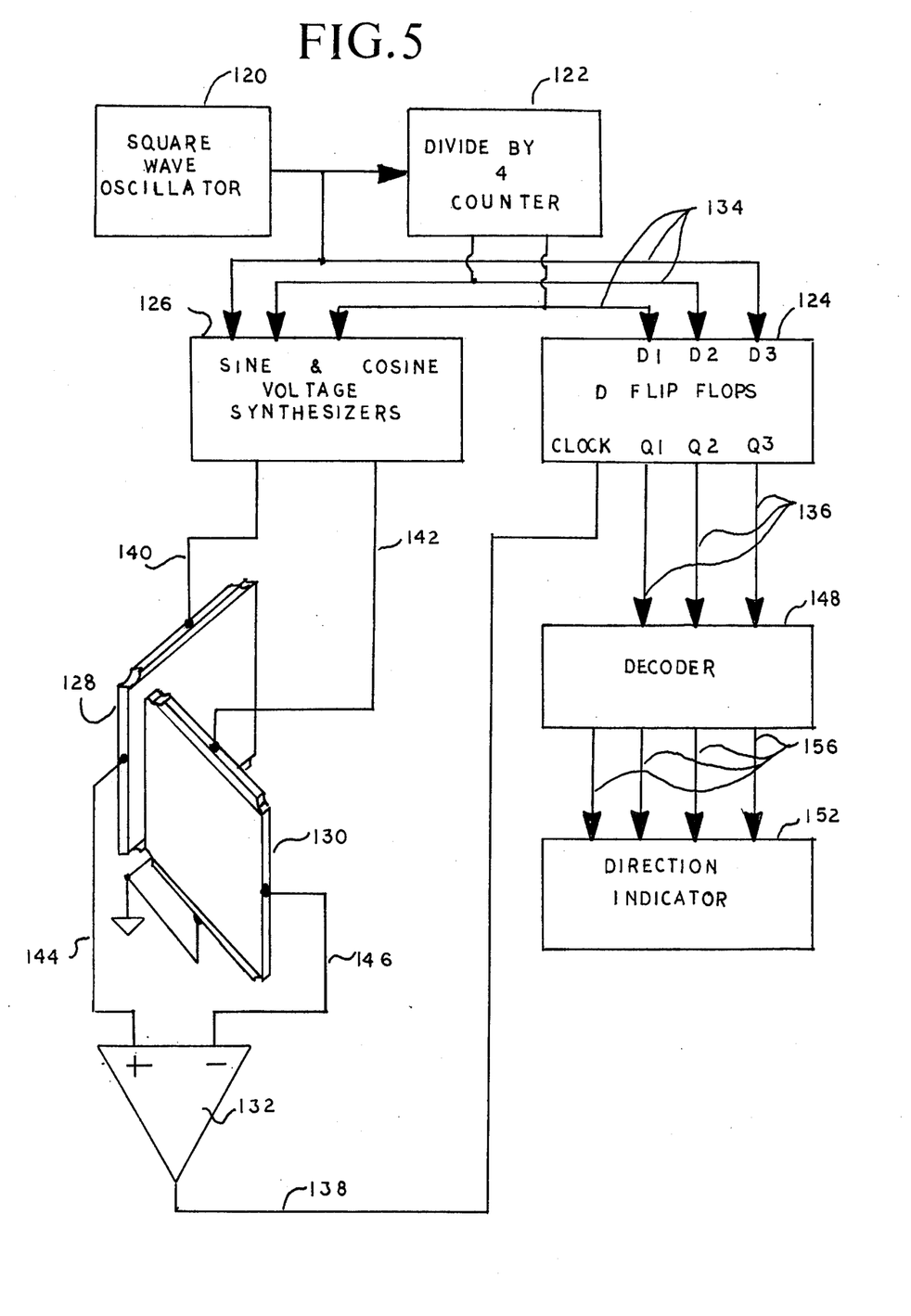
FIG. 5 is a simplified block diagram illustrating the connections between semiconductor elements and digital electronic circuits to form the solid state magnetic bearing sensor.
Figure 6:
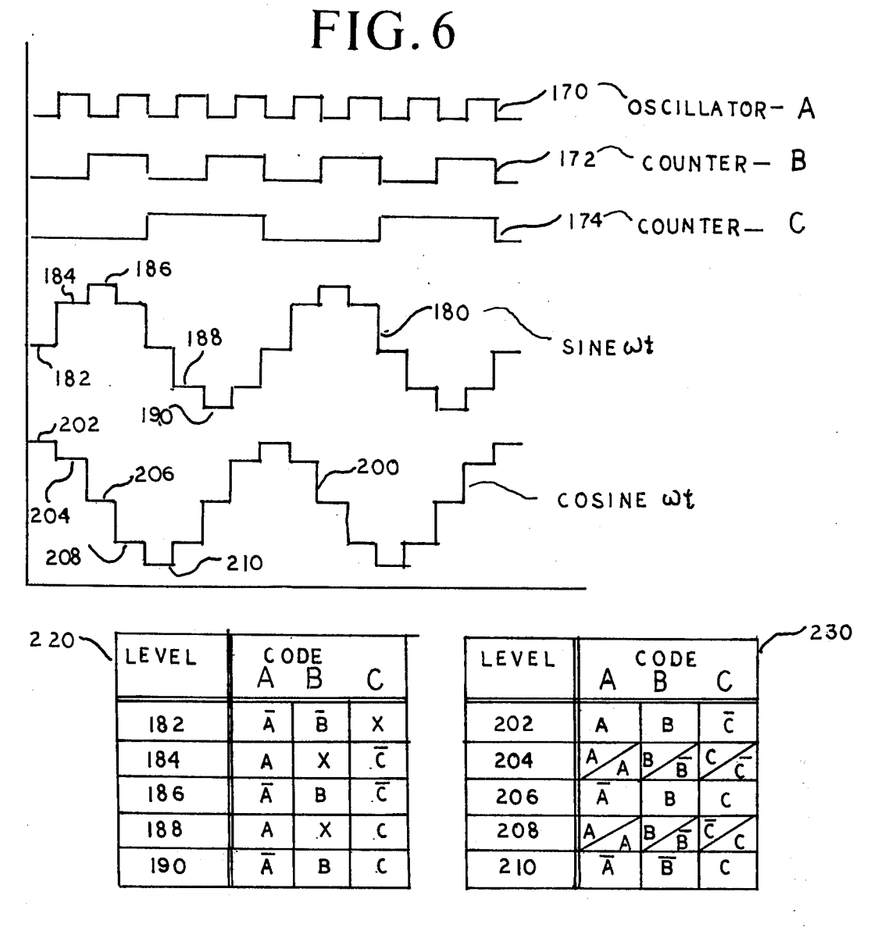
FIG. 6 illustrates timing relationships between input logic and output synthesized sin ωt, cos ωt waveforms.

A functional block diagram of the digital type solid state magnetic bearing sensor including Hall Effect semiconductors and ancillary electronics, is illustrated in FIG. 5. A square wave oscillator 120 drives a divide-by-four counter 122. Digital outputs, on lines 134 from counter and oscillator (3 bit codes) are connected to sine and cosine voltage synthesizer circuits 126 and to digital latch circuits 124. Approximations of sine and cosine output waveforms produced on lines 140 and 142 by the synthesizers 126 are connected to two semiconductor slabs 128 and 130 which are positioned in vertical planes and at right angles to one another. Hall voltages produced by the semiconductors on lines 144 and 146 are connected to voltage comparator amplifier 132. The comparator amplifier 132 outputs logic levels (zero or one) on line 138 to the clock inputs of D-type latch circuits 124. The D latches store codes 134 when clock line 138 switches from logic 0 to logic 1. The codes are outputted on Q lines 136 to decoding logic 148. Codes developed on lines 156 are in turn wired to a dashboard mounted direction indicator 152. In FIG. 6, truth tables 220 and 230 illustrate the logic level relationships between synthesizer outputs, sine $\omega t$, 180 and cos $\omega t$, 200 and synthesizer inputs, oscillator 170, and counter 172 and 174.

Figure 7:
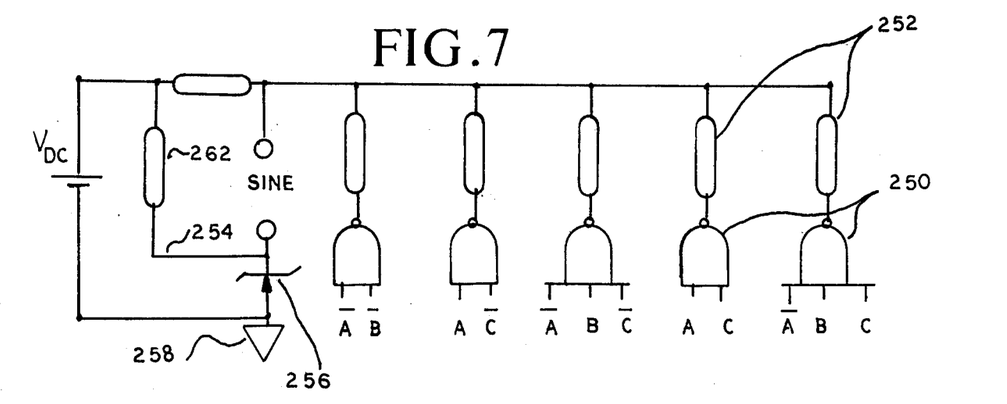
FIG. 7 illustrates a simple sine ωt voltage synthesizer circuit.

FIG. 7 illustrates synthesizer logic including gates 250 with resistor dividers 252 for synthesizing the sine $\omega t$ waveform. The mean sin $\omega t$ voltage (level 182, FIG. 6) shown on line 254 is biased above logic ground 258 by the voltage drop across the Zener diode 256. This arrangement eliminates the need for positive and negative logic levels or transformer coupling to create the alternating sin $\omega t$ voltage waveform.

Figure 8:
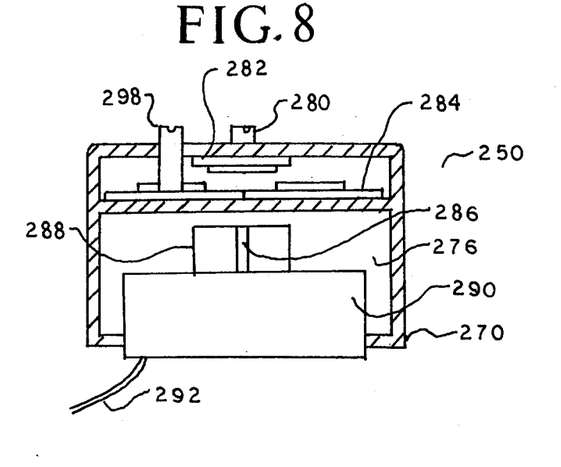
FIG. 8 is a longitudinal cross-section through a solid state magnetic sensor sub-assembly.

In FIG. 8 a longitudinal cross-section appears through a solid state magnetic-bearing sensor sub-assembly 250, forming a part of a compass system in accordance with the present invention. Sub-assembly 250 includes those elements which respond to the incident magnetic field of the earth. Accordingly, the said sub-assembly is rigidly secured to an automobile at a point relatively spaced from and unshielded by masses of ferromagnetic material.

Sub-assembly 250 includes a housing 270, in which is mounted at right angles to one another two Hall Effect semiconductor slabs 286 and 288 that are connected to integrated circuits housed in block 290. Codes indicative of vehicle bearing are connected through cable 292 to a bearing indicator readout unit mounted remotely, at the dashboard of the automobile. Sensor error caused by vehicle tilt may be eliminated by floating semiconductor 286, 288 in a fluid 276, thereby holding the semiconductor surfaces vertical.

Figure 9:
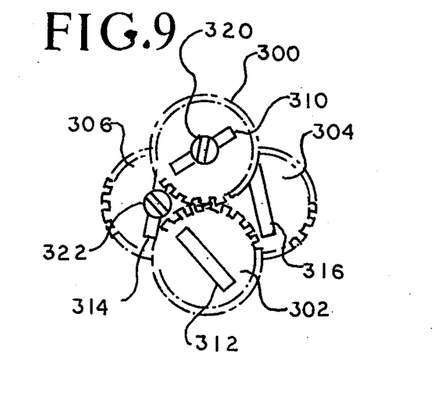
FIG. 9 is a plan view of the compensation magnet mechanism present in the FIG. 8 sub-assembly.

In order to permit compensation for the ferromagnetic materials present in the vehicle, pairs of opposed permanent magnets as at 310, 312, and at 314, 316 (FIG. 9) are mounted to gears 300, 302, 304, and 306. The gears 300 and 302 are meshed with one another, as are the gears 304 and 306. Shafts 280 and 298 extend respectively from gears 300 and 306, and are slotted at their distal ends 320 and 322 which extend outside housing 270. By means of a screwdriver inserted at such distal ends, one may accordingly manipulate the opposed gears as to more or less oppose magnets (such as 310, 312 ) to one another, and thereby to a desired degree, null incident spurious fields.

Figure 10:
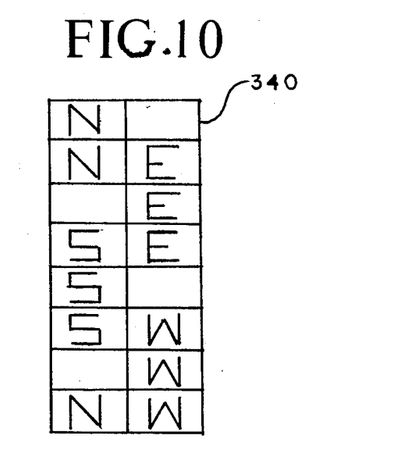
FIG. 10 is a plan view of an eight-state direction display device, utilizable with the present system.
Figure 11:
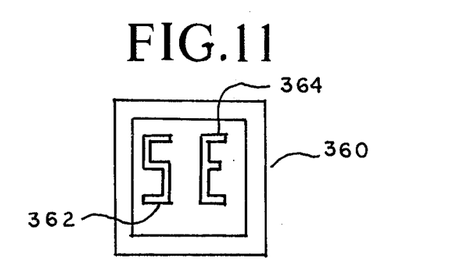
FIG. 11 shows a plan view of a display device.
Figure 12:
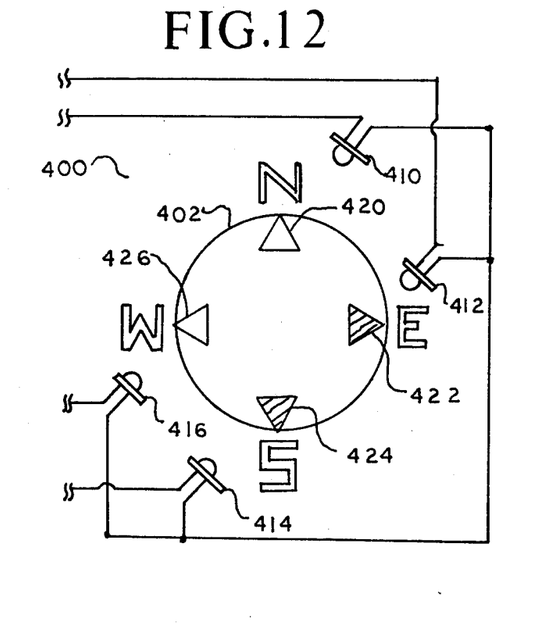
FIG. 12 shows a plan view of a further display device.

FIG. 10 is a plan view of a digital type bearing display device 340 which may form part of the readout unit connected to the cable 292 of FIG. 8. Device 340 is an eight-state indicator which preferably is part of the dashboard instrument cluster in the automobile. Device 340, may, however, even comprise (together with a casing etc.) a separate unit mountable as desired at or adjacent to the vehicle dashboard. Depending upon the vehicular angular position relative to magnetic field, one or another of the states "N", "NE", "SE", etc. will be indicated by discrete lamps (including e.g. light-emitting diodes) which underlie the appropriate destination. Another form of 8-state display device 360 is seen in FIG. 11. In this instance, a pair of segmented lamps 362, 364 comprise the display. These lamps are well known devices, a type, for example, being available from Hewlett-Packard Company. By illuminating selected segments of the lamps, characters are formed to display the desired state (e.g. NE, N, etc.). Still another form of eight-state display device appears in FIG. 12. Initially, it may be noted in the figure, that the dashboard mountable display 402 comprises a circular dial including four illuminatable indicators 420, 422, 424, and 426, which indicators may be lit along with the associated cardinal direction N, E, S, or W by lamps (or LED's) 410, 412, 414, and 416. The type of display shown enables eight-states to be recognized: e.g. N or S by lighting, respectively, of lamp 410, or 414 and similarly, the direction NE (or so forth) may be displayed by lighting both lamps 410 and 412. The lamps 410, 412, 414, and 416 are controlled by codes transmitted over cable 400 from decoding logic located with the solid state magnetic bearing sensor.

Figure 13:
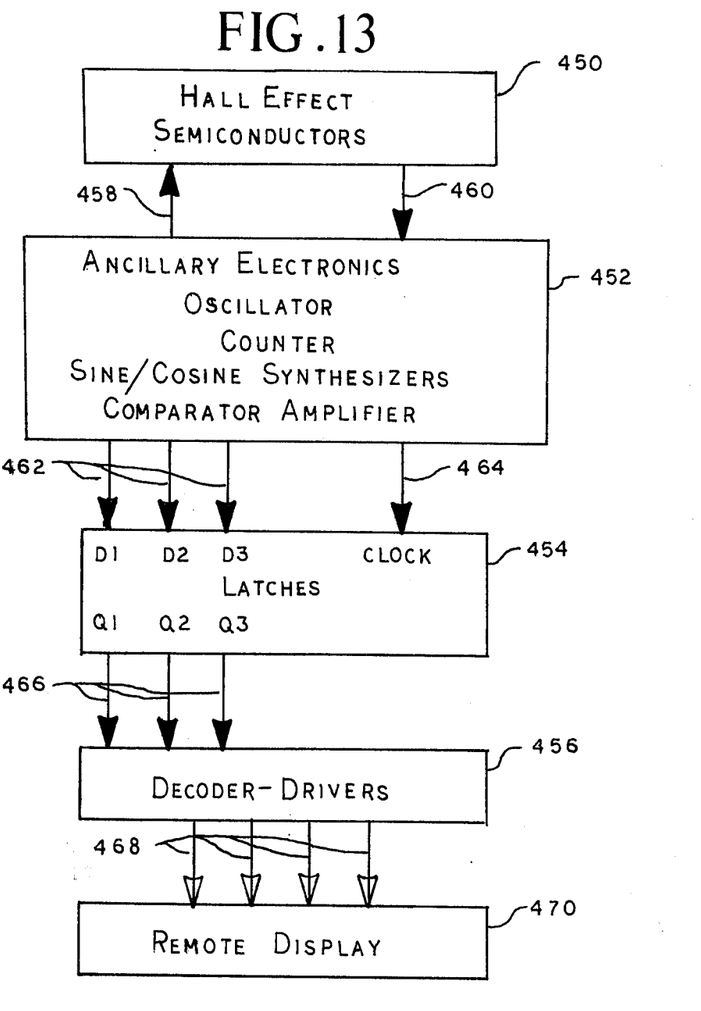
FIG. 13 is a simplified block diagram illustrating the general technique by which a digital display is enabled in the present invention.

It will be evident from the foregoing that the general mode of operation of the digital form of the instant invention is as is schematically depicted in FIG. 13. As thus seen therein, Hall Effect semiconductor elements 450 receive sin $\omega t$, cos $\omega t$ outputs 458 from ancillary electronic voltage synthesizers 452, which induces the flow of sinusoidal currents in the semiconductors. Hall Effect voltage outputs 460 produced in the semiconductors by current flowing in the presence of a magnetic field are connected to an ancillary electronic comparator amplifier. Binary codes 462 formed by ancillary electronic oscillator-counter circuits 452 which are used to control the synthesizers are also connected to the D inputs of D type latch circuits 454. Comparator amplifier output 464 is connected to the clock inputs of these D type latches. Codes 462 are transferred from the D Inputs to the Q outputs 466 of these latches whenever comparator amplifier output 464 switches from a logic 0 to a logic 1 level. Codes 466 which are indicative of magnetic heading are connected to decoder drivers 456. The driver outputs 468 control illumination of Remote Display 470.

Figure 14:
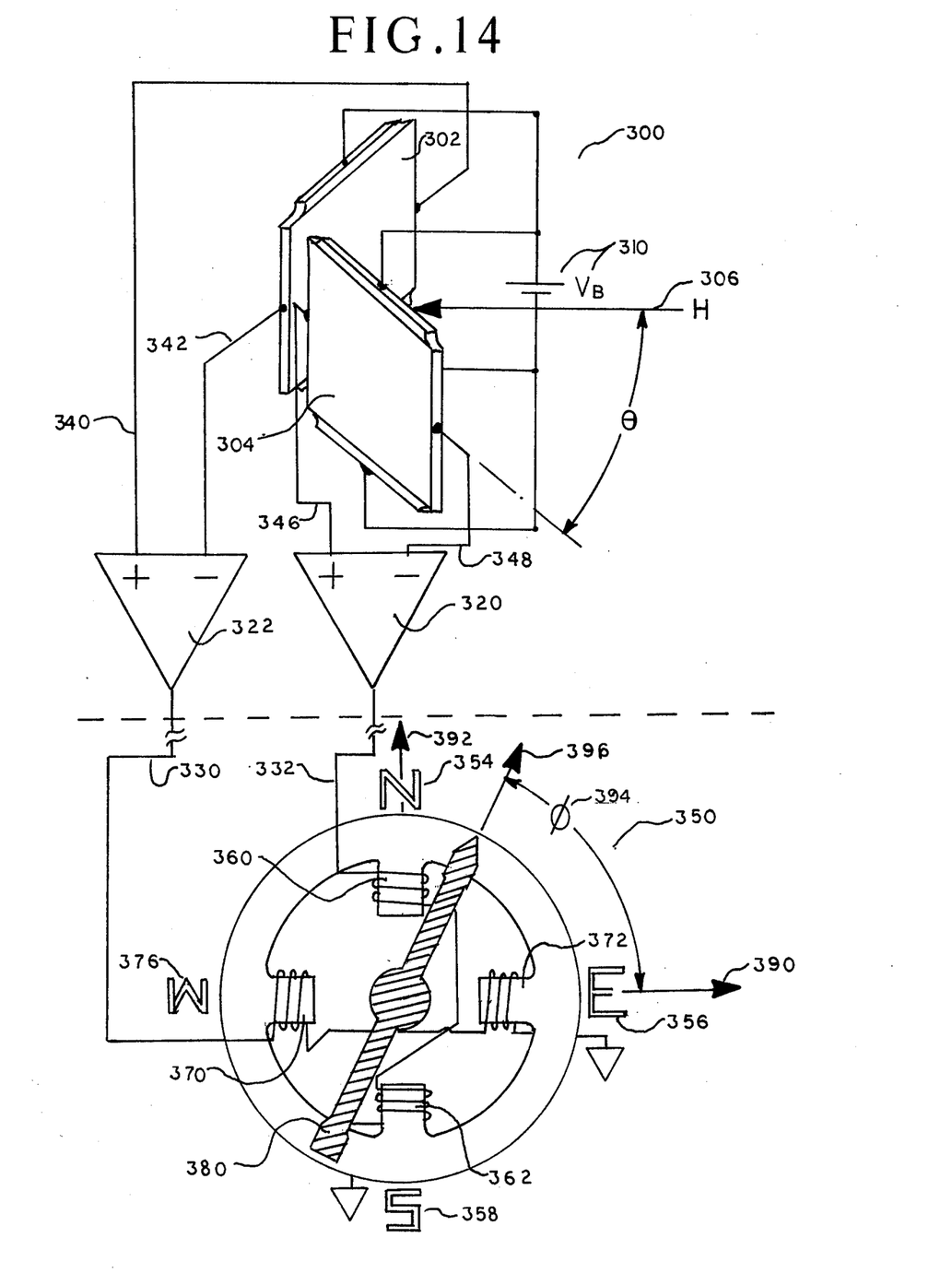
FIG. 14 is a simplified block diagram illustrating the connections between semiconductor elements, analog electronic circuits, and an analog type display device.

A functional block diagram of the analog form of the solid state magnetic bearing sensor system is illustrated in FIG. 14. Two Hall Effect semiconductor slabs 302, 304 mounted in vertical planes at right angles to one another are connected to a common d-c voltage bias $V_B$, 310. Hall Effect voltages that develop across lines 340, 342 and 346, 348 when the semiconductors are immersed in the earth's magnetic field, H 306, are amplified by linear differential amplifiers 320, 322. Since each semiconductor's Hall Effect voltage is proportional to the magnetic field component normal to its surface, the amplified levels of these Hall voltages which are developed on amplifier output lines 330, 332 are also, and are in fact proportional to H sin $\theta$ and H cos $\theta$ respectively where H is the magnetic field intensity 306 and the angle $\theta$ is the direction of H relative to semiconductor surface 304. The amplifier outputs 332, 330 are connected respectively to coils 360, 362 and 372, 370 associated with an analog type display mechanism 350. Coils 360, 362 are connected in series, and produce a magnetic field component MF sin $\phi$ 392 across the pole pieces on which they are wound which is proportional to the current which flows through them (i.e. H sin $\theta$). Likewise, coils 370, 372 are also connected in series, and produce a magnetic field component MF cos $\phi$ 390 across the pole pieces on which they are wound which is proportional to the current which flows through them, (i.e. H cos $\theta$). The resultant magnetic field MF 396, produced by components 392, 390, is directed along the angle $\phi$ 394. The angle $\phi$ follows the angle $\theta$ as does the magnetized needle pointer 380. Hence, bearing can be determined by the pointer's position with respect to indicators 354, 356, 358, 376.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

I claim:

1. A low-inertia remote-indicating magnetic compass utilizing a solid-state magnetic sensor and providing a continuous 360° read-out meter movement for use in automobiles or the like and comprising:

a magnetic sensor consisting of a pair of Hall generators mounted to a vehicle in vertical planes, at right angles to one another, with one of two corresponding pairs of each generator's parallel edges connected across a source of d-c voltage, and with the remaining two parallel pairs of edges connected to the inputs of linear amplifiers to amplify Hall voltages, proportional to sine and cosine components of the earth's magnetic field, and with adjustable compensation magnets in the vicinity of said generators to cancel spurious magnetic fields of said automobile.

an indicator consisting of a stator with quadrature windings connected to outputs of said linear amplifiers, a magnetized rotor-pointer which pivots about the stator's principal axis in response to currents in stator windings, and a circular compass scale, centered with respect to the rotor's pivot axis. Rotor position ranging through 360° and determined by relative magnitudes of quadrature winding currents, pointer-position relative to map scale indicative of vehicle heading.

* * * * *